Reissued Jan. 23, 1934

Re. 19,060

UNITED STATES PATENT OFFICE 19,060

DRAWING MATERIAL

Herman Emanuel Braeg, St. Mary's College, Calif., assignor, by direct and mesne assignments, to St. Mary's College, Oakland, Calif., a corporation of California No Drawing. Original No. 1,780,113, dated October 28, 1930, Serial No. 376,293, July 5, 1929. Application for reissue September 26, 1932. Serial No. 634,980

6 Claims. (Cl. 91—68)

This invention relates to improvements in drawing materials.

It is a primary object of this invention to provide on a sheet or board, a surface particularly adapted for painting on with pastel colors or chalks, and which is susceptible of being used repeatedly without deterioration.

It is a further object of this invention to provide an improved abrading surface for pastel boards and the like.

I have found that a pastel painting surface may be made up which will readily receive and retain the pastel colors and chalks applied thereto, and from which these colors may be erased so that the sheet or board may be used repeatedly. The product of this invention, therefore, is of high utility, particularly in respect to the economy it presents for the beginner or those who wish to practise.

In its broader aspect, the invention comprehends the fixing or emplacement on a suitable backing, such as paper, cloth, or cardboard, of an improved receptive surface of a hard substance in finely granulated or powdered form, which is firmly adhered to the backing in a manner to be described more in detail hereinafter.

"Carborundum" (silicon carbide) is the preferred substance for use in the novel combination here disclosed, but my invention comprehends the use of any other substance in the form of fine discrete particles, and having a range of hardness comparable to silicon carbide, which range, for the purpose of this disclosure, may be conveniently designated as 6 to 9 on the Mohs scale of hardness. The materials referred to may comprehend any of a number of materials, of which silicon carbide (hardness—9), garnet (hardness—6.5–7.5), and quartz (hardness—7), may be mentioned as preferred illustrations. These substances are characterized by a keen abrasive and gripping quality when presented in the form of a pastel or chalk receiving surface, and it is precisely in this hardness and keen abrasive quality of my improved pastel receiving surface that its superior merit consists.

The materials of the general class described are obtainable in varying degrees of fineness, and my invention comprehends their use in any degree of fineness desired. For general utility, I find that a finely crystalline powder is particularly suited for the reception of pastels and chalks generally.

The materials to be used must be applied to their backings in sufficient thickness to insure that enough tiny spaces or interstices are formed between the particles to provide gripping surfaces for the pastels. For this purpose there must be a uniform distribution of the discrete particles to a uniform depth over the entire surface. A mere scattering of the materials will not do. The layer applied, whether it be silicon carbide, garnet, quartz, or any of the non-rusting ferro-alloys, etc., must be present in at least a sufficient thickness to prevent the backing member from being seen or felt.

The materials may be applied to any suitable backing which has been appropriately treated with an adhesive, such as animal glue, vegetable glue, dextrin, gum tragacanth, gum arabic, and other like adhesive substances.

I have found that a surface made up in such a manner will readily take the friable colors applied thereto, and if it is desired to reuse the surface, it is merely necessary to wipe it off with a cloth or eraser, and blow the colors off.

Due to the sharpness of the particles forming the improved pastel surface, no matter in what degree of fineness they may be present, and also due to the uniform and sufficient spread of the particles, one color may be superimposed on top of previously applied colors, with the result that the color last applied shows in its own particular qualities without blending with the others, and this can be repeated quite a number of times before the surface becomes saturated.

This susceptibility, greater than heretofore attained, to resume the original surface, or to take a separate layer of color on an already existing one, will be of very great advantage to artists and students, and is a distinctive feature of the improved pastel surface of the present invention, in contrast to the hitherto known surfaces of sandpaper and the like. The improved surface of the present invention will be especially appreciated by teachers' students, and artists who work by the so-called "impressionistic" and allied modern methods.

It will, of course, be understood that any suitable color of background may be used without departing from the spirit and scope of my invention, and the present invention comprehends the preparation of suitably colored backgrounds by the proper selection of materials having the requisite hardness and color, or the materials used may be dyed or have a given color adhered thereto in any suitable manner. Thus, it will be seen that the color of the surface which is to be painted may be varied, and the degree of light or dark to choose for the background in painting a particular subject may be of interest. Commonly, the surface should be as canvases are; i. e., light gray, warm or cold.

Where a gray surface is to be used, the materials may be dyed, as above set forth, or silicon carbide ("carborundum"), which is black, and quartz, or other like white materials, may be blended in varying proportions to give the desired degree of gray ("value") or of color. It will, of course, be appreciated, that the finer the degree of division of the particles, the more uniform will be the tone of the resulting mixture, which, for the purposes of this invention may be treated and applied as a material of uniform color or value.

While I have described preferred embodiments of my invention, in which an improved surface of a fine-grained, pitted, substantially very hard nature, is provided for the reception of chalks and pastels, it is to be understood that they are given merely for purposes of illustration, the scope of my invention being defined by the appended claims.

What is claimed is:

1. As an article of manufacture, an improved pastel receiving surface, including a base of fibrous material, and a coating of a monochromatic mix comprising silicon carbide, garnet and quartz powder adhered thereto to a uniform depth.

2. As an improved material for the reception of chalks, pastels, and the like, an intimate, substantially monochromatic mixture of a plurality of varicolored hard crystalline substances such as silicon carbide, garnet and quartz in finely discrete form.

3. As an article of manufacture a pastel picture comprising a pastel receiving surface including a base of fibrous material and a coating of a monochromatic mix comprising silicon carbide, garnet and quartz powder adhered thereto to a uniform depth, and a vari-colored coating of pastel colors applied to such surface.

4. A pastel picture, comprising a backing, a coating of adhesive on the backing, a layer of finely divided abrasive particles applied over the adhesive coating and forming a fine-grained pitted surface having between the abrasive particles tiny interstices which hold the applied pastel colors and permit the superimposition of one color over a previously applied color, and a vari-colored coating of pastel colors applied to and adherent in the pitted abrasive surface.

5. A pastel picture, comprising a backing, a coating of adhesive on the backing, a layer of finely divided hard, sharp abrasive particles applied over the adhesive coating and forming a monochromatic fine-grained pitted surface having between the abrasive particles tiny interstices which hold the applied pastel colors and permit the superimposition of one color over a previously applied color, the abrasive layer being of sufficient thickness to prevent the backing from being seen or felt, and a vari-colored coating of pastel colors applied to and adherent in the pitted abrasive surface.

6. A pastel picture, comprising a backing, a coating of adhesive on the backing, a layer of fine, sharp abrasive particles applied over the adhesive coating and forming a fine-grained pastel receiving surface, and a vari-colored coating of pastel colors applied over such surface.

HERMAN EMANUEL BRAEG.